United States Patent
Liu et al.

(10) Patent No.: US 9,633,306 B2
(45) Date of Patent: Apr. 25, 2017

(54) METHOD AND SYSTEM FOR APPROXIMATING DEEP NEURAL NETWORKS FOR ANATOMICAL OBJECT DETECTION

(71) Applicant: Siemens Healthcare GmbH, Erlangen (DE)

(72) Inventors: David Liu, Franklin Park, NJ (US); Nathan Lay, Plainsboro, NJ (US); Shaohua Kevin Zhou, Plainsboro, NJ (US); Jan Kretschmer, Nürnberg (DE); Hien Nguyen, Princeton, NJ (US); Vivek Kumar Singh, Monmouth Junction, NJ (US); Yefeng Zheng, Princeton Junction, NJ (US); Bogdan Georgescu, Plainsboro, NJ (US); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 40 days.

(21) Appl. No.: 14/706,108

(22) Filed: May 7, 2015

(65) Prior Publication Data

US 2016/0328643 A1 Nov. 10, 2016

(51) Int. Cl.
G06N 3/08 (2006.01)
G06K 9/00 (2006.01)
G06T 7/00 (2017.01)

(52) U.S. Cl.
CPC .......... *G06N 3/08* (2013.01); *G06K 9/00362* (2013.01); *G06N 3/082* (2013.01); *G06N 3/084* (2013.01); *G06T 7/0012* (2013.01); *G06K 2209/05* (2013.01); *G06T 2207/20084* (2013.01)

(58) Field of Classification Search
CPC ....... G06N 3/08; G06N 3/084; G06K 9/00362
See application file for complete search history.

(56) References Cited

U.S. PATENT DOCUMENTS

| | | | |
|---|---|---|---|
| 7,783,459 B2* | 8/2010 | Rozell | G06G 7/26 341/50 |
| 8,700,552 B2 | 4/2014 | Yu et al. | |
| 2005/0169529 A1* | 8/2005 | Owechko | G06K 9/6254 382/190 |
| 2011/0218950 A1* | 9/2011 | Mirowski | A61B 5/0476 706/12 |

(Continued)

OTHER PUBLICATIONS

Xu et al, "Deep Learning of Feature Representation With Multiple Instance Learning for Medical Image Analysis," 2014, IEEE International Conference on Acoustics, Speech and Signal Processing (ICASSP), 5 pages.*
De Brebisson A. et al: "Deep Neural Networks for Anatomical Brain Segmentation"; XP55337395, Retrieved from the Internet: URL:https://arxiv.org/pdf/1502.02445v1.pdf / Feb. 9, 2015.
Denton E. et al: "Exploiting Linear Structure Within Convolutional Networks for Efficient Evaluation", pp. 1-16, , Retrieved from the Internet; Apr. 2, 2014.

(Continued)

*Primary Examiner* — David F Dunphy

(57) ABSTRACT

A method and system for approximating a deep neural network for anatomical object detection is discloses. A deep neural network is trained to detect an anatomical object in medical images. An approximation of the trained deep neural network is calculated that reduces the computational complexity of the trained deep neural network. The anatomical object is detected in an input medical image of a patient using the approximation of the trained deep neural network.

33 Claims, 12 Drawing Sheets

(56) References Cited

U.S. PATENT DOCUMENTS

| | | |
|---|---|---|
| 2013/0023715 A1* | 1/2013 | Raleigh ............... A61N 5/1037 600/1 |
| 2013/0138436 A1 | 5/2013 | Yu et al. |
| 2013/0138589 A1* | 5/2013 | Yu ........................... G06N 3/08 706/25 |
| 2013/0177235 A1* | 7/2013 | Meier .................... G06T 15/00 382/154 |
| 2015/0112182 A1 | 4/2015 | Sharma et al. |
| 2015/0125049 A1 | 5/2015 | Taigman et al. |
| 2015/0161987 A1 | 6/2015 | Horesh et al. |
| 2015/0161988 A1 | 6/2015 | Dognin et al. |
| 2015/0170002 A1 | 6/2015 | Szegedy et al. |
| 2016/0180200 A1* | 6/2016 | Vijayanarasimhan . G06N 3/082 382/157 |

OTHER PUBLICATIONS

Gong Y. et al: "Compressing Deep Convolutional Networks using Vector Quantization" ,pp. 1-10, XP055262159, Retrieved from the Internet; UDec. 18, 214.

Zhang et al: "Efficient and Accurate Approximations of Nonlinear Convolutional Networks"; XP055337086, Retrieved from the Internet: URL:https://arxiv.org/pdf/1411.4229v1.pdf; Nov. 16, 2014.

He Tianxing et al: "Reshaping deep neural network for fast decoding by node-pruning"; 2014 IEEE International Conference on Acoustics, Speech and Signal Processing (ICASSP), IEEE, pp. 245-249; May 4, 2014.

Cheng Y. et al: "Fast neural networks with circulant projections", arXiv:1502.03436v1 [cs.CV], XP055210210, Retrieved from the Internet: URL:http: //arxiv.org/ abs ; Feb. 11, 2015.

\* cited by examiner

402

404

METHOD AND SYSTEM FOR APPROXIMATING DEEP NEURAL NETWORKS FOR ANATOMICAL OBJECT DETECTION

BACKGROUND OF THE INVENTION

The present invention relates to anatomical object detection using deep neural networks, and more particularly, to approximating deep neural networks for anatomical object detection.

One of the biggest challenges in machine learning and pattern recognition is the curse of dimensionality. The curse of dimensionality refers to the notion that the complexity of a learning problem grows exponentially with a linear increase in the dimensionality of the data. For this reason, data is commonly pre-processed by dimensionality reduction techniques of feature extractions in order to extract a meaningful and compact representation of the data that can be effectively handled by machine learning classifiers. Accordingly, data representation is an important factor that affects the performance of artificial intelligence systems.

Deep learning mimics the behavior of mammal brains in order to extract a meaningful representation from a high dimensional input. Data is passed through multiple layers of a network. The primary layers extract low-level cues, such as edges and corners for natural images. Deeper layers compose simple cues from previous layers into higher-level features. In this way, powerful representations emerge at the end of the network. The gradual construction of a deep network prevents the learning from be exposed to a high complexity of data too early. Several theoretical works show that certain classes of functions (e.g., indicator function) could be represented by a deep network, but require exponential computation for a network with insufficient depth.

Recently, deep learning has been applied with high accuracy to pattern recognition problems in images. However, the benefits of deep networks come at the cost of high computational costs during the evaluation phase. In particular, fully connected deep networks are orders of magnitude slower than traditional machine learning classifiers, such as linear support vector machines (SVM) and random forest classifiers. It is desirable to improve the run-time speed for deep networks to make such deep learning technology more practical for various applications including for light-computing platforms, such as mobile phones and computer tablet devices.

Various approaches have been attempted to improve the computations aspect of deep learning. Graphics processing units (GPUs) have been shown to speed up training by several orders of magnitude. However, most widely used computing devices are not equipped with a powerful GPU. Another way to speed up such deep networks is convolutional networks such as convolutional neural nets (CNNs) or convolutional deep belief nets. Separable filters could also be used to improve the speed of convolutional networks. However, these approaches require data to have tensor structures which limits the scope of the application of such deep learning technology. In addition, convolutional networks and separable filters can degrade the overall classification accuracy due to the structure that they impose on the filters of the deep network.

BRIEF SUMMARY OF THE INVENTION

The present invention provides a method and system for approximating a deep neural network for anatomical object detection. Embodiments of the present invention various methods to reduce the computational complexity of a trained deep neural network. Embodiments of the present invention perform anatomical object detection in medical image data using an approximated deep neural network that is more computationally efficient than the deep neural network originally trained for the object detection task.

In an embodiment of the present invention, a deep neural network is trained to detect an anatomical object in medical images. An approximation of the trained deep neural network is calculated that reduces the computational complexity of the trained deep neural network. The anatomical object is detected in a received medical image of a patient using the approximation of the trained deep neural network.

In one embodiment, weight sparsification can be used to calculate the approximation of the trained deep neural network. In another embodiment, function approximation can be used to reduce a number of nodes in each level of the trained deep neural network classifier. In another embodiment, 1-D Haar wavelet bases and wavelet coefficients can be used to reconstruct a weight matrix for a given node in a layer of the trained deep neural network. In another embodiment, principal component analysis (PCA) can be applied to a space of the weight matrices over all of the nodes in a layer of the trained deep neural network.

These and other advantages of the invention will be apparent to those of ordinary skill in the art by reference to the following detailed description and the accompanying drawings.

DETAILED DESCRIPTION

The present invention relates to a method and system for approximating deep neural networks for anatomical object detection in medical images. Embodiments of the present invention are described herein to give a visual understanding of the methods for approximating deep neural networks and anatomical object detection in medical images. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
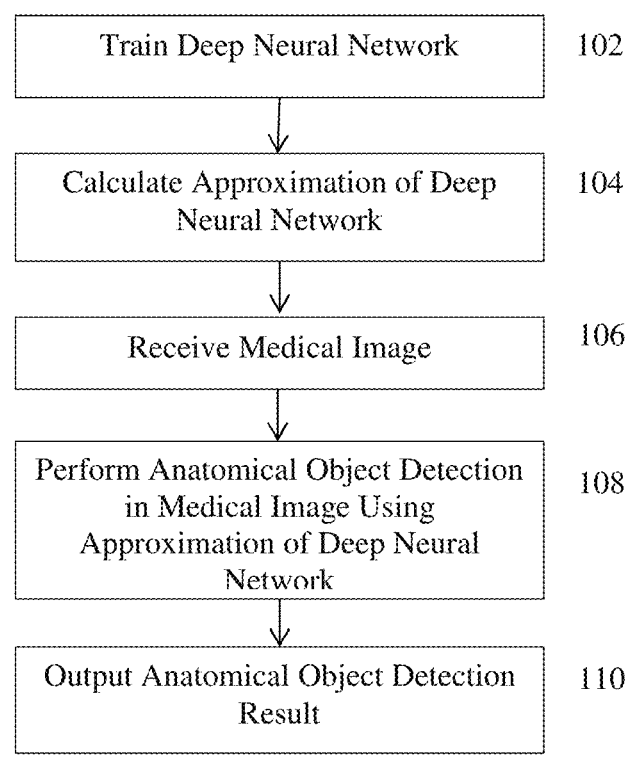
FIG. 1 illustrates a method for anatomical object detection in a medical image using a deep neural network approximation according to an embodiment of the present invention.

FIG. 1 illustrates a method for anatomical object detection in a medical image using a deep neural network approximation according to an embodiment of the present invention. Steps 102 and 104 of FIG. 1 are performed in an offline training phase. These steps train a deep neural network for anatomical landmark detection in medical image data and calculate a corresponding approximation of the trained deep neural network, and are performed offline prior to an online testing phase (steps 106-110) in which the approximation of the trained deep neural network is used to perform anatomical landmark detection in a new unseen medical image.

At step 102, a deep neural network is trained. Deep neural networks are machine learning based neural networks with multiple hidden layers of learned features or variables between the input data and the output data. According to an advantageous implementation, the deep neural network will typically be implemented with three or more hidden layers. In an advantageous embodiment, the deep neural network is trained to detect an anatomical landmark in medical image data. In particular, the anatomical landmark can be trained to detect a 2D location (x,y) of the anatomical landmark in a 2D medical image or to detect a 3D location (x,y,z) of the anatomical landmark a 3D medical image. Although embodiments of the present invention may be applied to 2D or 3D medical images, the term "pixel" is used herein to refer to an element of a medical image, regardless of the dimensionality. The deep neural network is trained based on a plurality of training images stored in a database. The training images can be 2D or 3D medical images acquired using any medical imaging modality, such as but not limited to CT, MRI, Ultrasound, X-ray fluoroscopy, DynaCT, etc. At least a subset of the training images are annotated the location of the target anatomical object. The training images may also include non-annotated images as well. In a possible implementation, the trained deep neural can be a discriminative deep neural network that calculates, for an image patch centered at a pixel, a probability that the target anatomical landmark is located at that pixel. In another possible implementation the trained deep neural network can be a deep neural network regressor (regression function) that calculates, for an image patch centered at pixel, a difference vector from that pixel to a predicted location of the target anatomical landmark.

Figure 2:
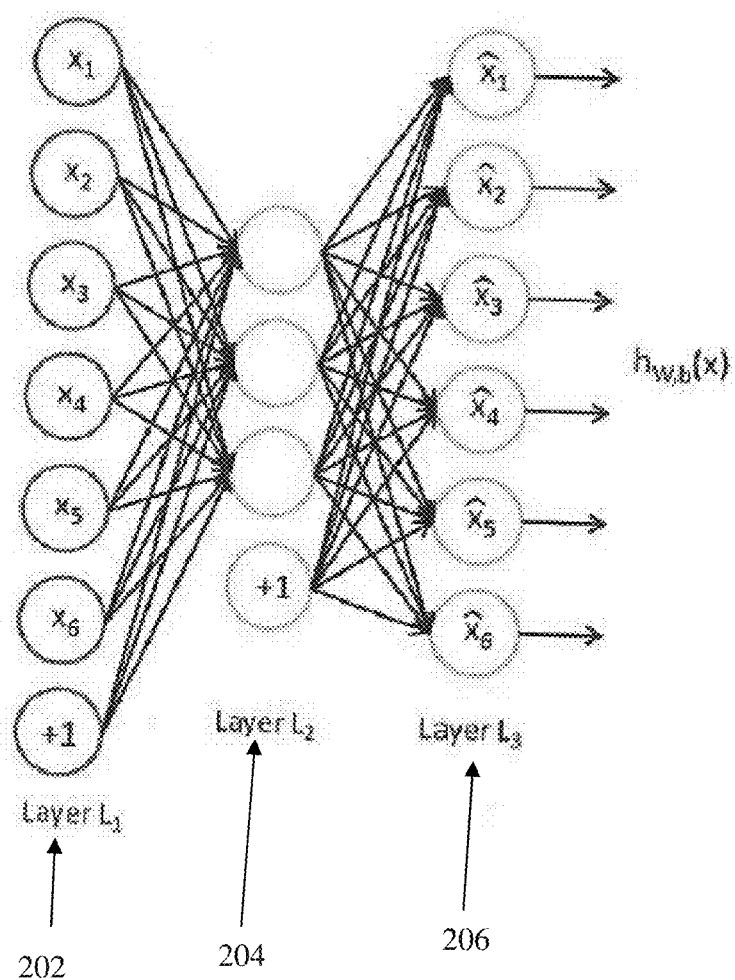
FIG. 2 illustrates an exemplary AE neural network.

The deep neural network is trained directly on the image data to learn complex image patterns and detect anatomical objects based on the complex image patterns. A feed-forward neural network is a neural network structure with an efficient training algorithm called back-propagation. Although powerful enough to approximate complicated target functions, a large feed-forward neural network tends to over-fit the training data. It is difficult to train a network with more than two hidden layers with good generalization capability. In a possible embodiment, unsupervised pre-training followed by supervised fine-tuning can be used to overcome the over-fitting issue. This technique can be used to train networks with three or more hidden layers. The pre-training can be treated as an unsupervised learning process to discover powerful image features from the input image data. Various deep learning techniques, such as an auto-encoder (AE), denoising auto-encoder (DAE) or a restricted Boltzman machine (RBM), can be used to pre-train a hidden layer. FIG. 2 illustrates an exemplary AE neural network. As shown in FIG. 2, the AE 200 is a feed-forward neural network with one hidden layer 204. The AE 200 has an input layer $L_1$ 202, the hidden layer $L_2$, and an output layer $L_3$ 206. If the AE 200 is a fully connected network, each node in the input layer 202 can correspond to a respective voxel or pixel of an image patch. Ignoring the bias term (the nodes labeled as +1 in FIG. 2), the input and output layers 202 and 206, respectively have the same number of nodes. The goal of an AE is to minimize the difference between the input and output vectors. If the hidden layer 204 has a size equal to or larger than the input layer 202, an AE may learn an identify transformation. To prevent such a trivial solution, an AE can be set up with a hidden layer 204 with fewer nodes than the input layer 202. The nodes of the hidden layer 204 can be calculated as a function of a bias term and a weighted sum of the nodes of the input layer 202, where a respective weight is assigned to each connection between a node of the input layer 202 and a node in the hidden layer 204. The bias term and the weights between the input layer 202 and the hidden layer 204 are learned in the training of the AE 200, for example using a back-propagation algorithm. The nodes of the hidden layer 204 can be considered to be features extracted from the pixels (represented by the nodes of the input layer 202) of an input image patch, and the learned weights can be considered to be filters that filter the input image data to generate the features.

A denoising auto-encoder (DAE) may be used to learn a more meaningful representation of the input image data. In a DAE, a certain percentage (e.g., 50%) of the input nodes are randomly selected to be disturbed (e.g., set the value equal to zero) and the DAE is required to reconstruct the original input vector given a contaminated observation. This significantly increases the robustness of the resulting trained deep neural network. The hidden layer in a DAE may have more nodes than the input layer to achieve an over-complete representation. In an advantageous embodiment, the deep neural network is trained using a stacked denoising auto-encoder (DAE) in two stages. The first stage is unsupervised where each layer of the multi-layer deep neural network is trained to reconstruct the input image data. In this stage, after training a DAE with an output layer that reconstructs the input layer, the output layer is discarded and another DAE is stacked using the activation response of the already trained hidden layer as input to the new DAE. This process can be repeated to train and expand a network layer by layer. The second stage is supervised and the whole network error is minimized relative to the output training data starting from the pre-trained network weights. For example, in order to train a discriminative deep neural network, after pre-training a number of hidden layers, an additional layer for the target output can be added to the network and the whole network can be refined using back-propagation. Alternatively, the output of the hidden layers can be treated as high-level image features and used to train a discriminative classifier for detecting the anatomical object. In order to train a deep neural network regressor, the output parameter space can be either directly regressed using a linear function or it can be discretized relative to the parameter range (e.g., (x,y) or (x,y,z)) and solved as a multi-class classification problem. The second formulation has an advantage that it can directly encode the output probability and can generate multiple hypotheses, for example for different anatomical objects.

Returning to FIG. 1, at step 104, an approximation of the trained deep neural network is calculated. In particular, an approximation of the trained deep neural network is calculated that reduces a computational complexity of the trained deep neural network. Although training the deep neural network (step 102) and calculating an approximation for the deep neural network (step 104) are illustrated as separate steps in FIG. 1, the present invention is not limited thereto. In some embodiments, the deep neural network may be fully trained, and then the approximation of the trained deep neural network is calculated. In some embodiments, the approximation of the deep neural network may be calculated as the deep neural network is being trained or multiple iterations of training and approximating may be performed. Various embodiments for approximating the trained deep neural network are described below, including Haar wavelet approximation, principal component analysis (PCA) approximation, weight sparsification (SparseConnect), and reducing the nodes of each hidden layer (ShrinkConnect).

At step 106, in an online testing phase, a medical image of a patient is received. The medical image can be a 2D or 3D image and can be acquired using any medical imaging modality, such as but not limited to CT, MRI, Ultrasound, X-ray fluoroscopy, DynaCT, etc. The medical image of the patient can be received directly from an image acquisition device, such as a CT scanner or an MRI scanner, or the medical image of the patient can be received by loading a medical image previously stored in a memory or storage device of a computer system.

At step 108, anatomical object detection is performed in the medical image using the approximation of the trained deep neural network. In a possible implementation, a sliding window approach can be used in which a respective image patch centered at each pixel or voxel is extracted from the medical image. Each image patch is input to the approximation of the trained deep neural network, which operates directly on the pixels or voxels in each patch. If the trained deep neural network is a discriminative deep neural network, the approximation of the trained deep neural network calculates for each image patch, a probability that the target anatomical landmark is located at the pixel or voxel at which the image patch is centered. The location with the highest probability can then be selected as the detected anatomical landmark location in the medical image. If the trained deep neural network is a deep neural network regressor, the approximation of the trained deep neural network outputs a difference vector for each image patch that provides a displacement from the pixel or voxel at which the image patch is centered to a predicted location of the target anatomical landmark in the medical image. The predicted locations from each of the image patches can then be aggregated to determine the detected anatomical landmark location in the medical image.

At step 110, the anatomical object detection result is output. For example, the anatomical object detection result can be output by displaying the medical image on a display device of the computer system with the anatomical object location marked or highlighted in the displayed medical image.

Although the method of FIG. 1 is described for a single deep neural network trained to detect a location of an anatomical landmark, the present invention is not limited thereto. For example, the method of FIG. 1 and each of the embodiments for approximating a deep neural network described below can be applied to each of a series of deep neural networks trained in a series of search spaces of increasing dimensionality to detect pose parameters (position, orientation, and scale) for an anatomical object in a medical image in a Marginal Space Deep Learning (MSDL) or Marginal Space Deep Regression (MSDR) framework, as described in U.S. Provisional Application No. 62/148,273, filed Apr. 16, 2015, entitled "Method and System for Anatomical Object Detection Using Marginal Space Deep Neural Networks," which is incorporated herein by reference in its entirety.

Haar Wavelet Approximation

According to an embodiment of the present invention, Haar wavelet approximation can be used to calculate the approximation of the trained deep neural network for anatomical landmark detection. In object or landmark detection problems, a sliding window approach can be used, where a large number of image patches are examined while sliding the window over the whole image or volume. For example, a respective image patch centered at each pixel or voxel of an image can be examined. In order to apply the learned weights for a hidden layer of a trained deep neural network to a particular image patch, a Frobenius inner product is computed, which is the component-wise inner product between the matrix of pixel values for the input image patch and the weight matrices associated with the nodes of a hidden layer of trained deep neural network. In this embodiment of the present invention, a Haar wavelet transform is performed on the weight matrix for each hidden layer in order to effectively reduce the number of computations required for the Frobenius inner product. Integral imaging techniques can also be exploited for increase computational efficiency. Since the same set of weight matrices are repeatedly being used to calculate the Frobenius inner product with various image patches, it is advantageous to represent the weight matrices using wavelet bases which require fewer coefficients than the original number of elements in the weight matrix.

Figure 3:
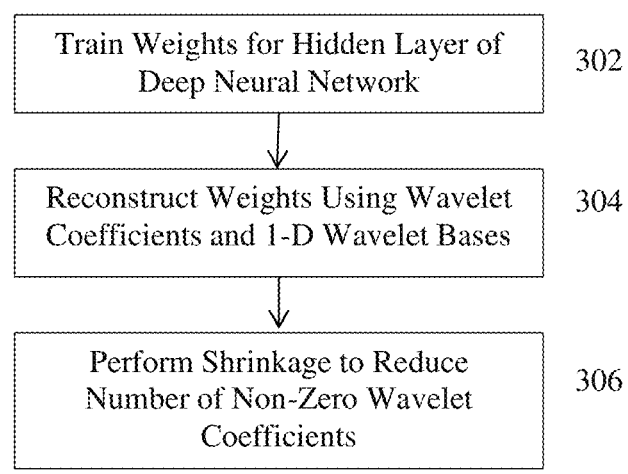
FIG. 3 illustrates a method of approximating the weights of a hidden layer of deep neural network using Haar wavelet approximation according to an embodiment of the present invention.

FIG. 3 illustrates a method of approximating the weights of a hidden layer of deep neural network using Haar wavelet approximation according to an embodiment of the present invention. The method of FIG. 3 can be performed for each hidden layer (or each including the output layer) after training is complete for the entire trained deep neural network or the method of FIG. 3 can be performed for each layer during training prior to training the subsequent layer of the deep neural network. At step 302, weights are trained for a hidden layer of the deep neural network. The weights for the hidden layer are trained as describe above in connection with step 102 of FIG. 1. For example, the weights of the hidden layer can be trained using a back propagation algorithm.

At step 304, the weights of the hidden layer are reconstructed using wavelet coefficients and one-dimensional 1-D wavelet bases. Without loss of generality it is assumed for the purpose of this description that the input to the trained deep neural network is a 2D image. In this case, P denotes a 2D image patch, W denotes the weights of the neural network connected to any one of the hidden units (i.e., nodes of a hidden layer), and Dim(W)=Dim(P). The goal is to speed up the computation of $P:W=\Sigma_m\Sigma_n P(m,n)W(m,n)$, which is the component-wise inner product of the two matrices as though they are vectors, also known as the Frobenius inner product. We use $\Phi$ to denote the transpose of wavelet bases. The wavelet bases can be used to reconstruct the neural network as:

$$W(m,n)=\Sigma_k\Sigma_l\Phi_{k,l}(m,n)Y(k,l) \quad (1)$$

which reconstructs the neural network weights by wavelet coefficients Y. This can be expressed in 1-D wavelet bases as:

$$W(m,n)=\Sigma_k\Sigma_l\Phi_k(m)Y(k,l)\Phi_l(n). \quad (2)$$

In an advantageous implementation, Haar wavelet bases are used. For example, 4×4 Haar wavelet bases can be expressed as:

$$\Phi_4 = \begin{bmatrix} 1 & 1 & 1 & 0 \\ 1 & 1 & -1 & 0 \\ 1 & -1 & 0 & 1 \\ 1 & -1 & 0 & -1 \end{bmatrix} \quad (3)$$

It is to be understood that the present invention is not limited to the wavelet bases shown in Equation (3), and other sizes of the wavelet bases can be used as well.

At step 306, shrinkage is performed on the wavelet coefficients to reduce the number of non-zero wavelet coefficients. Achieving a sparse set of wavelet coefficients Y to represent each weight matrix speeds up the computations. The sparsity of the wavelet coefficients is obtained by wavelet shrinkage, which can be implemented using soft or hard thresholding of coefficients with small values. For example, all wavelet coefficients having a value less than a predetermined threshold may set equal to zero or predetermined number of largest wavelet coefficients can be preserved with the remaining wavelet coefficients set equal to zero.

Figure 4:
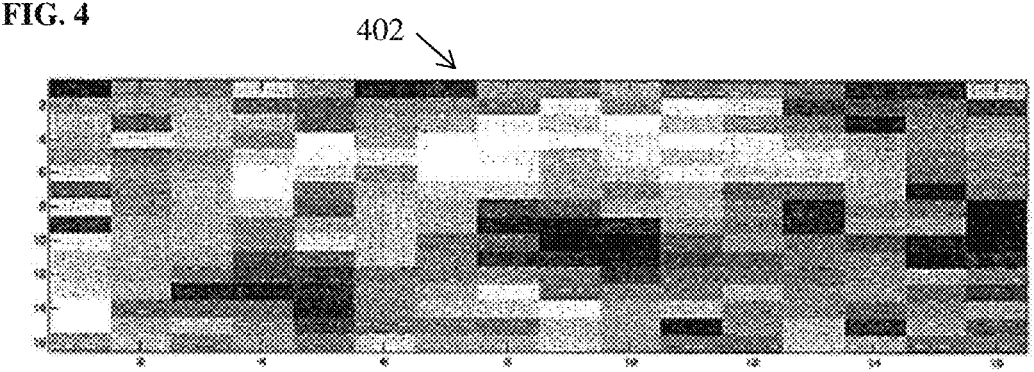
FIGS. 4 and 5 illustrate examples of approximating weight matrices for nodes of a hidden layer of a trained deep neural network using the method of FIG. 3.
Figure 4:
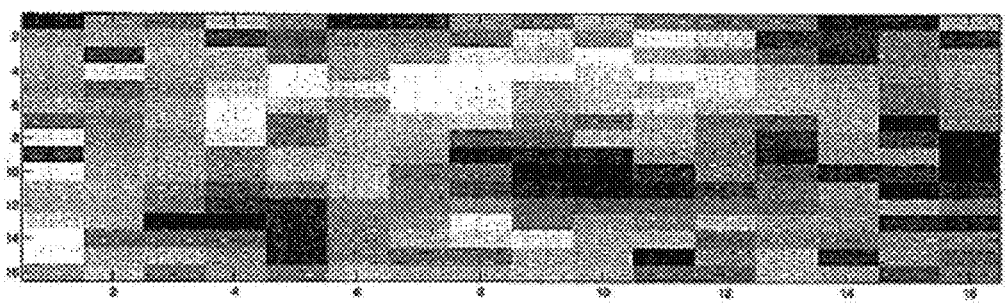
Figure 5:
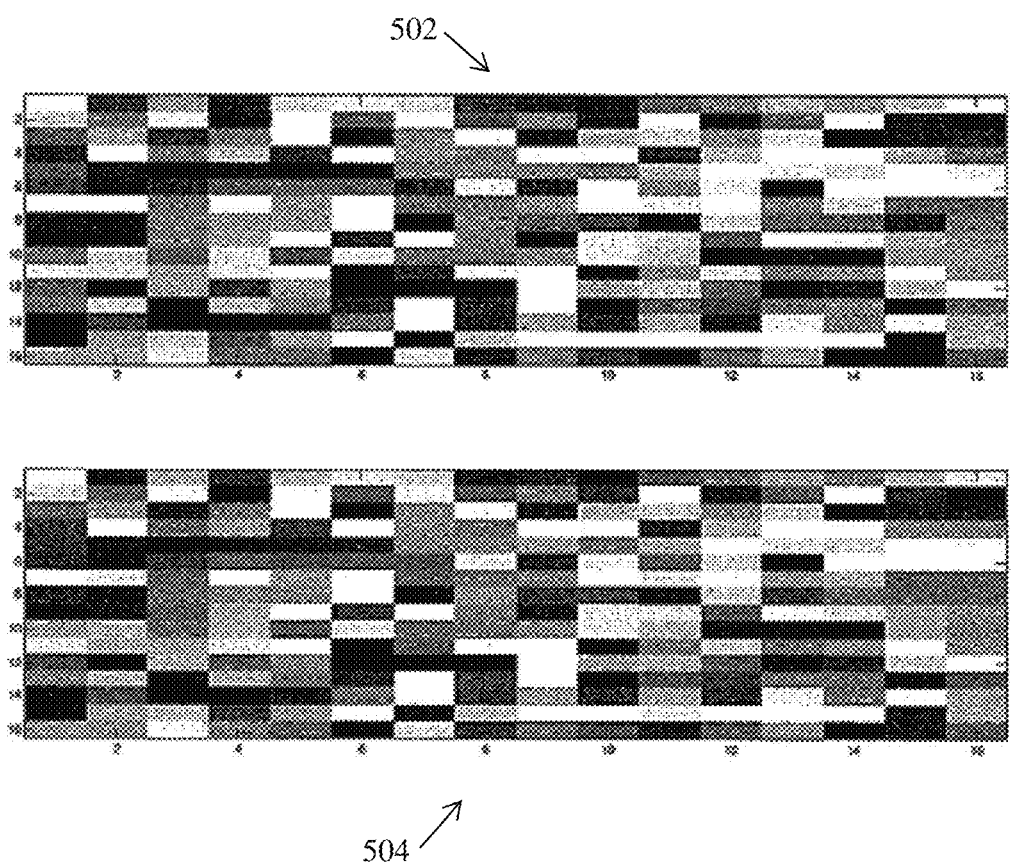

FIGS. 4 and 5 illustrate examples of approximating weight matrices for nodes of a hidden layer of a trained deep neural network using the method of FIG. 3. As shown in FIG. 4, image 402 is a visualization of an original trained weight matrix associated with a hidden layer node, and image 404 is a visualization of an approximation of the weight matrix shown in image 402 using Haar wavelet reconstruction with half of the wavelet coefficients set to zero. As shown in FIG. 4, image 502 is a visualization of an original trained weight matrix associated with another hidden layer node, and image 504 is a visualization of an approximation of the weight matrix shown in image 502 using Haar wavelet reconstruction with half of the wavelet coefficients set to zero.

Once all the weight matrices of the hidden layer are reconstructed using the wavelet coefficients and the 1D wavelet bases and shrinkage is performed on the wavelet coefficients, the wavelet coefficients and 1D wavelet bases can be used on the input image patches in place of the weight matrices in order to approximate the Frobenius inner product $P:W=\Sigma_m\Sigma_n P(m,n)W(m,n)$, as follows:

$$\Sigma_m\Sigma_n P(m,n)W(m,n) = \Sigma_m\Sigma_n P(m,n)W(m,n) = \Sigma_k\Sigma_l\Phi_k(m)Y(k,l)\Phi_l(n) \quad (4)$$
$$= \Sigma_k\Sigma_l Y(k,l)\Sigma_m\Phi_k(m)\Sigma_n P(m,n)\Phi_l(n)$$
$$= \Sigma_k\Sigma_l Y(k,l)\Sigma_m\Phi_k(m)P\Phi$$
$$= \Sigma_k\Sigma_l Y(k,l)\Phi^T P\Phi$$

Accordingly, the Frobenius inner product $P:W=\Sigma_m\Sigma_n P(m,n)W(m,n)$ is approximated as the inner product of Y and $\Phi^T P\Phi$.

In order to perform the anatomical landmark detection (step 108 of FIG. 1), the sliding window approach can be used where a plurality of image patches P are examined while sliding over the whole image or volume V. The computation of $\Phi^T P\Phi$ for each image patch for each node of the hidden layer can be sped up using integral imaging techniques when Haar wavelets are used for the wavelet bases. An integral image the same size as the original image is stored in a look-up table and the Haar wavelet bases determine which items (pixels) in the look-up table will be looked up. For example, the 4×4 Haar wavelet bases $\Phi_4$ shown in Equation (3) can be used, but the present invention is not limited thereto. In this 4×4 case, matrix multiplication $P\Phi$ amounts to four look-up operations for the multiplication with the first column of $\Phi_4$, four table look-ups and a minus operation for the second column, and two table look-ups and a minus operations for each of the third and fourth columns. This is faster than direct matrix multiplication. The same speed up can be obtained for the multiplication with $\Phi^T$. The same analysis described herein can be similarly applied to larger Haar wavelet bases as well.

Once $Z=\Phi^T P\Phi$ is obtained, the Frobenius inner product of Y and Z may seem as computationally expensive as the original goal of computing $P:W=\Sigma_m\Sigma_n P(m,n)W(m,n)$. However, the wavelet coefficients Y are sparse due to the shrinkage applied to the wavelet coefficients in step 306, which results in less computations. Since the wavelet coefficients are computed offline from the neural network weight matrices rather than during detection, the shrinkage operation will not adversely affect detection speed.

Figure 6:
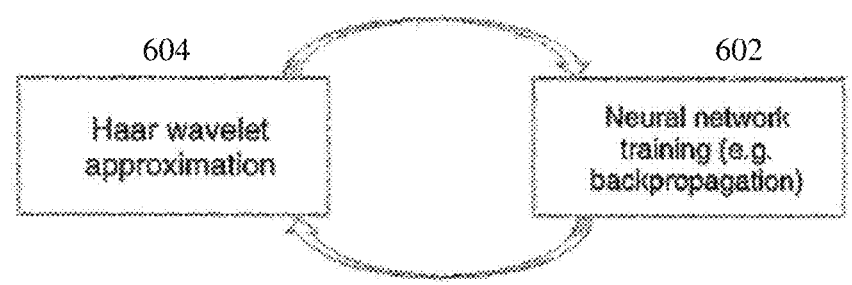
FIG. 6 illustrates iteratively training a deep neural network while approximating the weight matrices using wavelet approximation according to an embodiment of the present invention.

The method of FIG. 3 is performed for each hidden layer (or each layer) in the trained deep neural network. As described above, the method of FIG. 3 can be performed for each hidden layer during training prior to training the subsequent layer of the deep neural network. In a possible implementation, the Haar wavelet approximation for each hidden layer can be performed during training of the deep neural network using iterative approximation and training steps. FIG. 6 illustrates iteratively training the deep neural network while approximating the weight matrices using wavelet approximation according to an embodiment of the present invention. As shown in FIG. 6, at step 602 neural network training is performed to train the weights matrices of the neural network, and at step 604, Haar wavelet approximation is performed to reconstruct the weights using 1D Haar wavelet bases and wavelet coefficients and a number of wavelet coefficients are set to zero. Steps 602 and 604 are then iterated. In each round of iteration, the wavelet coefficients that are set to zero are kept at zero, while the remaining coefficients are adjusted by the neural network training algorithm, such as backpropagation. The iterations can be repeated until a number of wavelet coefficients remaining converges, for a predetermined number of iterations, or until a stopping condition associated with a decrease in accuracy of the approximation of the deep neural network is reached. In an exemplary implementation, the steps of FIG. 6 can be iterated for each hidden layer during the training of the hidden layer. In another embodiment, each iteration of step 604 can be performed for each hidden layer of a trained deep neural network and each iteration of step 602 can re-train the whole deep neural network.

Principal Component Analysis Approximation

In another embodiment of the present invention, principal component analysis (PCA) can be used to reduce computational costs by exploiting redundancy over all of the hidden layer units (nodes). As described above, the Haar wavelet approximation was performed individually for the weight matrix W of a given node (unit) of a hidden layer. PCA can be used to exploit redundancy over all of the hidden layer nodes of a hidden layer. This can be achieved in the space of the neural network weight matrices {W} or in the space of the wavelet coefficients {Y} calculated in the Haar wavelet approximation. The PCA approximation will first be explained herein using the space of the neural network weight matrices {W}.

Using PCA, the weight matrix $W_i$ for a given hidden layer unit i as $\alpha_{i,1}U_1 + \ldots + \alpha_{i,K}U_K$, where K indicates the reduced dimensionality, which can be a predetermined value set to maintain a certain amount of approximation accuracy. Hence the Frobenius inner products $P:W_i$ of an image patch with the weight matrices for each of the hidden units can be approximated as:

$$P:W_i = \alpha_{i,1} U_1:P + \ldots + \alpha_{i,K} U_K:P \tag{5}$$

If K is smaller than the number of hidden layer units H, then the K values $U_1:P, \ldots, U_K:P$ can be computed much faster than $P:W_1, \ldots, P:W_H$, and therefore achieve a speed up in computing P:W over all hidden layer units. The PCA approximation can be combined with the Haar wavelet analysis by applying PCA to the space of the Haar wavelet coefficients {Y} to obtain an additional speed up in computing $Y:\Phi^T P \Phi$ over all hidden layer units of a hidden layer.

SparseConnect: Weight Sparsification

For illustrative purposes, the SparseConnect approximation methods and the ShrinkConnect approximation methods (described below) are described herein as being used in combination with a stacked denoising auto-encoder (DAE) deep neural network. However it is to be under stood that these methods can be similarly applied to any other trained deep neural network. Let W denote the weight matrix and h denote the output at each layer, and the input-output of an auto-encoder can be expressed as:

$$h^{(l)} = f(W^{(l)} x + b^{(l)}) \tag{6}$$

where $f$ is a non-linear rectification function like sigmoid function. The training of a deep neural network, such as a stacked denoising auto-encode can be performed based on stochastic gradient descent of a cost function measured as the Euclidean distance between predicted outcomes and the observations in the training data. In an ideal world, each node in the network should extract different pieces of information from the input image data so that the combination of nodes yields an accurate and robust prediction for the landmark location. However, there is no explicit constraint to prevent different nodes from learning the same thing. Moreover, due to the highly complex and non-convex nature of the optimization procedure used to train the deep neural network, the trained deep neural network will likely contain significant redundancy.

In this embodiment of the present invention, the trained neural network is simplified by introducing sparsity to the coefficients of the filters. As used herein, the term "filter" refers to the weight matrix of a particular node of a layer of the deep neural network. Accordingly, each layer has a plurality of nodes and each node has a weight matrix or "filter" that is used to filter or combine the data from the nodes of the previous layer. Sparsity can be introduced to the coefficients of the filters in different ways. For example, in a possible implementation, a percentage of coefficients having the largest magnitudes can be retained in each filter, with the remaining coefficients set to zero. In another possible implementation L1-norm minimization can be enforced in the back-propagation algorithm, which will drive a number of the coefficients in each filter to zero. Since the connections between the inputs and neurons (nodes) are made sparse, we refer to this approach as "SparseConnect". It is important to note that SparseConnect is different from the traditional practice which enforces the output of hidden units, instead of the filters' weights, to be sparse. The SparseConnect methods described herein result in higher run-time efficiency than the traditional practice. For a particular node (unit) of a layer in the deep neural network, the output is approximated as:

$$h_i^{(l)}(x) = f(\Sigma_{j \in S_i^l} W_{ij}^{(l)} x_j + b_i^{(l)}) \tag{7}$$

where $S_i^l$ is the indexed set of retained connections of the i-th filter at l-layer. The smaller the set $S_i^l$, the greater the speed up that can be achieved, at the cost of a stronger perturbation introduced to the network. In an advantageous implementation, once the reduced set of coefficients is determined for each filter, the deep neural network can be refined using supervised back-propagation to alleviate the effects introduced by the perturbation. In this refinement step, only the active coefficients are updated, while the coefficients set to zero remain at zero.

Figure 7:
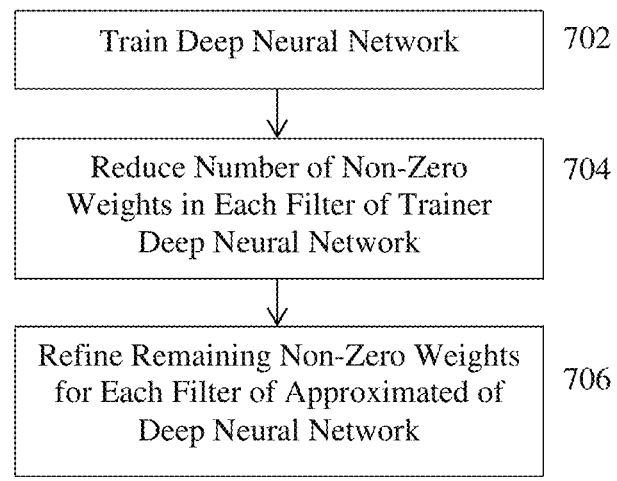
FIG. 7 illustrates a method of approximating a trained deep neural network using weight sparsification according to an embodiment of the present invention.

FIG. 7 illustrates a method of approximating a trained deep neural network using weight sparsification according to an embodiment of the present invention. At step 702, the deep neural network is trained. For example, the deep neural network can be trained using a stacked DAE in an unsupervised learning stage followed by a supervised learning stage as described above in connection with step 102 of FIG. 1. At step 704, a number of non-zero weights (coefficients) in each filter is reduced. The number of non-zero weights in each filter is reduced by setting a number of weights in the filter to zero and retaining other weights in the filter, such that a sparse set of weights is retained in each filter. For example, the number of non-zero weights in each filter can be reduced using thresholding or by enforcing L1-norm minimization in the back-propagation algorithm, as described in greater detail below. At step 706, the remaining non-zero weights of each filter in the approximated deep neural network resulting from step 704 are refined. In particular, a supervised training algorithm, such as supervised back-propagation can be used to re-train the approximated deep neural network based on the observed outcomes in the training data, by refining the remaining non-zero weights for each filter with the weights that were set to zero constrained to stay at zero. Step 706 can be repeated for a large number of iterations to refine the non-zero weights to achieve greater accuracy in the landmark detection. In a possible implementation for the method of FIG. 7, step 704 can be performed once to remove a large number (e.g., 90%) of non-zero weights in each filter (e.g., using thresholding or L1-norm minimization), and then step 706 can be performed and possibly repeated multiple times to refine the remaining non-zero weights in each filter, resulting in the final approximation of the trained deep neural network. In another possible implementation, steps 704 and 706 can be iterated to gradually reduce the number of non-zero weights for each filter to achieve a sparse set of weights. In this implementation, each iteration of step 704 can reduce a smaller number (e.g., 10%) of non-zero weights for each filter (using thresholding or L1-norm minimization) and each iteration of 706 can refine (possible multiple times) the remaining non-zero weights. Steps 704 and 706 can be iterated until a stopping condition is reached. For example, an accuracy of the approximated deep neural network can be calculated using the training data after each iteration, and when the accuracy decreases by a certain amount, the method can be stopped and the approximated deep neural network resulting from the previous iteration can be used. It is also possible that these steps can be iterated until a target percentage of weights in each filter are set to zero.

In a possible embodiment, thresholding can be used to sparsify the weights of the network. In particular, a certain percentage of weights that have the largest magnitudes in each filter can be retained with the rest of the weights set to zero. In a possible implementation large percentage (e.g., 90% or 95%) of the weights can be set to zero each filter, and then a number of iterations (e.g., 30) of supervised back-propagation can be performed to refine the remaining non-zero weights. In another possible implementation, a smaller percentage (e.g., 10%) of weights can be set to zero, followed by supervised back-propagation to refine the remaining weights, and these steps can be iterated until a target percentage of weights in each filter are set to zero or until an overall accuracy of the approximated deep neural network decreases by a certain amount.

In order to evaluate the effectiveness of this approach, the present inventors have used this approach in left ventricle (LV) apex detection in 2D MR images. The dataset contains 7961 images from 184 patients, from which positive and negative patches of 32×32 pixels were sampled. 75% of the patches were randomly selected for training and the rest were used for testing. Images of the same patient appear multiple times within the same set, but not both. Positive patches were generated by placing the center at the annotated ground truth can cropping the corresponding image patch. Negative patches were sampled far away from the ground truth location of the LV apex. A stacked DAE deep neural network was trained for detecting the LV apex in 2D MR images. The noise fraction of the DAE is set to 50%, i.e., 50% of the input pixels were randomly set to zero. The size of the layers of the trained deep neural are 1024-1024-300-100-2. The training was initialized with unsupervised pre-training and then refined using supervised back-propagation. Table 1 shows the 2D LV apex classification error of approximations of the deep neural network generated using weight sparsification performed by thresholding with different sparse factors.

TABLE 1

| Network | Error (%) |
|---|---|
| Original (non-sparse) | 3.09 |
| 20% non-zero (5 times speedup) | 3.09 |
| 10% non-zero (10 times speedup) | 3.09 |
| 5% non-zero (20 times speedup) | 4.07 |
| 1% non-zero (100 times speedup) | 11.05 |

Figure 8:
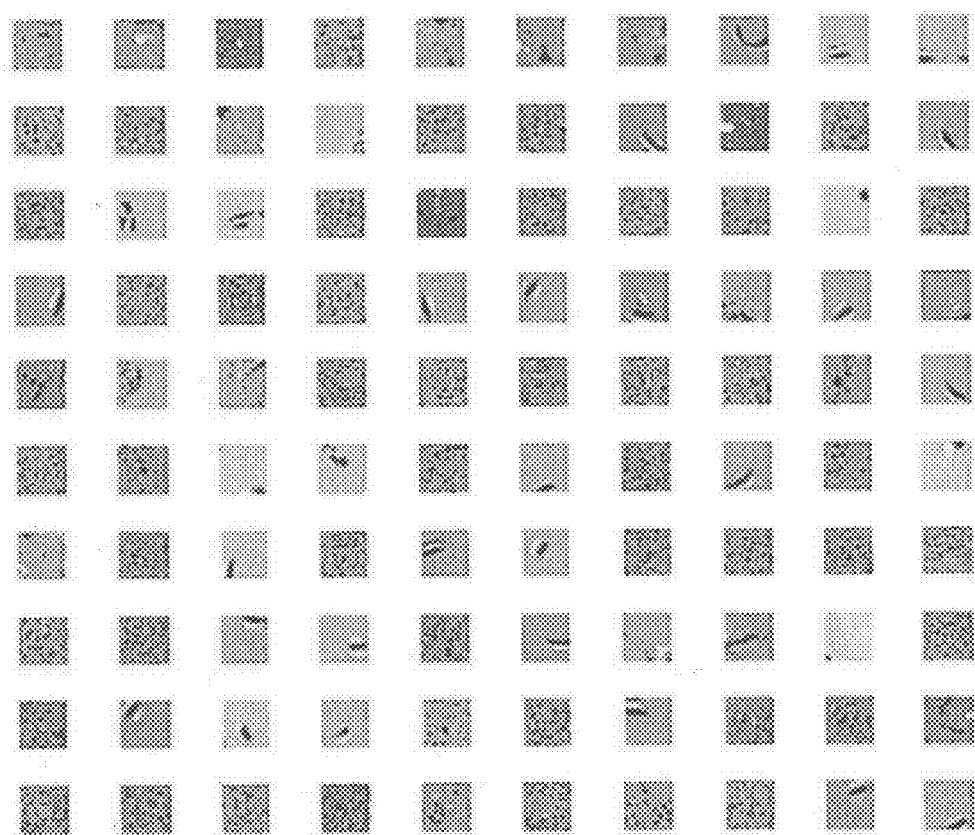
FIG. 8 illustrates a visualization of random filters of an exemplary approximation of a trained deep neural network using weight sparsification performed by thresholding.

As shown in Table 1, it is possible to eliminate a significant portion (e.g., 95%) of each filter's coefficients (weights) without losing much in accuracy. FIG. 8 illustrates a visualization of random filters of an exemplary approximation of a trained deep neural network using weight sparsification performed by thresholding. In particular, FIG. 8 shows a visualization of sparse filters with 10% of the non-zero coefficients remaining from the original trained filters of a trained deep neural network for LV apex detection in 2D MR images.

In another possible embodiment, the weight sparsification can be performed using re-weighted L1-norm minimization. Certain filters may be irrelevant to the final classification results of the trained deep neural network. Consequently, retaining a fixed number of coefficients (weights) in every filter may not produce an optimal speed up. According to an advantageous implementation, the back-propagation algorithm (or other deep neural network training algorithm) can be used to decide which coefficients to discard based on how important they are to the final classification accuracy. After the deep neural network is initially trained, the following term can be added to the cost function that is minimized in the back-propagation algorithm in order to promote sparsity within the network's weights:

$$\Sigma_l \|\Gamma^{(l)} \star W^{(l)}\|_1 \quad (8)$$

where ★ denotes the element-wise multiplication and Γ is a matrix whose coefficients are computed as:

$$\Gamma_{ij}^{(l)}(\text{iteration } t+1) = \frac{1}{|W_{ij}^{(l)}(\text{iteration } t)| + \epsilon} \quad (9)$$

This re-weighting scheme reduces the effect of the L1-norm magnitude of the objective function by multiplying each coefficient in the L1-norm with a term approximating the inverse of its magnitude. The re-weighting of the L1-norm makes the regularization look more like L0-norm regularization, and drives a large number of weights that are less relevant to the final classification result to zero. Once the re-weighted L1-norm minimization is performed using back-propagation, back-propagation can be performed again using stochastic gradient descent (i.e., with the original cost function) to refine the remaining non-zero coefficients.

In a possible implementation, the re-weighted L1-norm minimization using back-propagation can be performed once to drive a number of weights in the filters of the trained deep neural network to zero, and the remaining non-zero weights can then be refined using supervised back propagation with the original cost function. In another possible implementation, multiple iterations of re-weighted L1-norm minimization to drive a number of weights to zero and refinement of the remaining non-zero weights using supervised back-propagation with the original cost function can be performed. In this case, the iterations may be performed until the accuracy of the approximated deep neural network decreases by a certain amount, and then the approximated deep neural network resulting from the previous iteration can be used.

Figure 9:
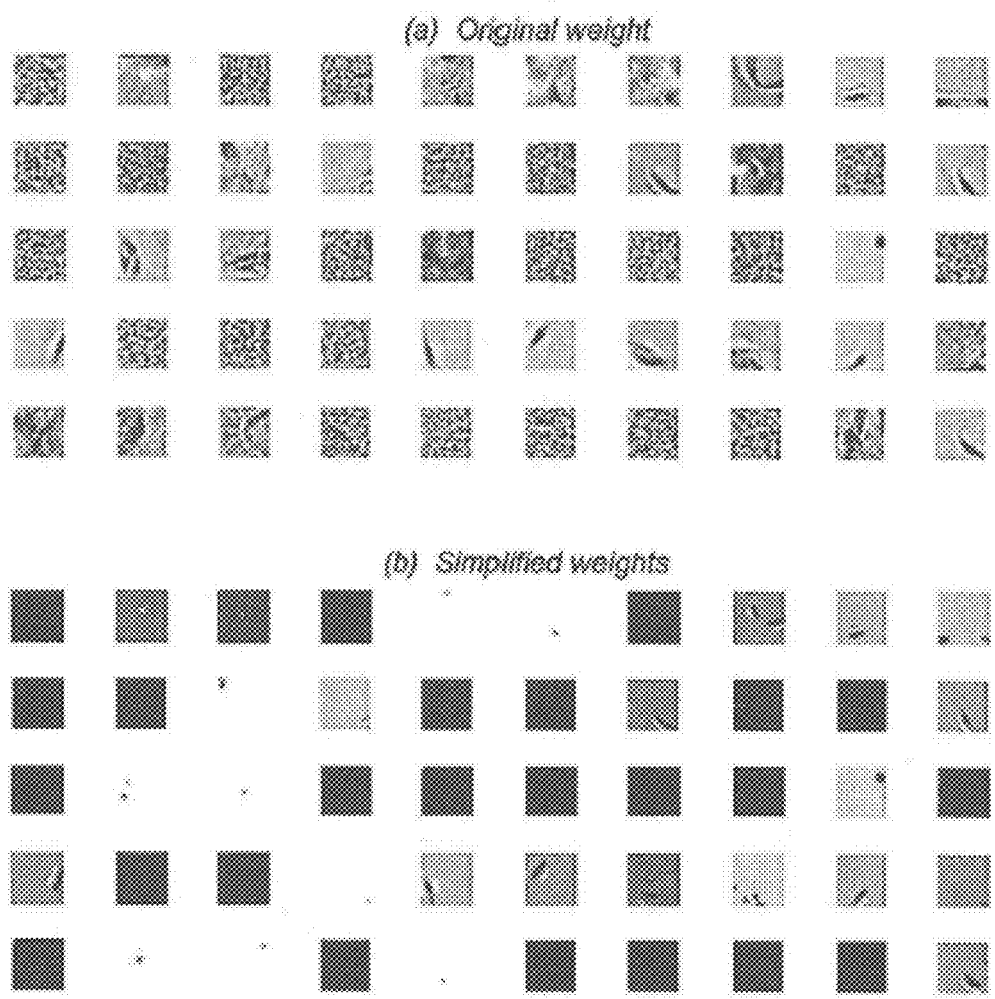
FIG. 9 illustrates a visualization of exemplary filters of a trained deep neural network before and after approximation of the trained deep neural using weight sparsification performed by re-weighted L1-norm minimization.

The present inventors tested the approximation of the trained deep neural network using weight sparsification performed by re-weighted L1-norm minimization on the trained deep neural network for LV apex detection in 2D MR images. This method achieved 60 times speed up with an error rate of 3.57% on the LV apex detection problem using 50 refinement iterations. This error may decrease even more with additional back-propagation epochs to further refine the sparse set of remaining non-zero weights. FIG. 9 illustrates a visualization of exemplary filters of a trained deep neural network before and after approximation of the trained deep neural using weight sparsification performed by re-weighted L1-norm minimization. As shown in FIG. 9, image (a)

shows a visualization of the filters of the trained deep neural network with the original weights, and image (b) shows a visualization of the filters an approximation of the deep neural with simplified weights. It can be observed in FIG. 9 that filters with more structures retain more non-zero coefficients while random-looking filters have mostly zero coefficients. It can also be observed that the filters have a variable percentage of non-zero coefficients instead of a fixed fraction as in the case of thresholding.

ShrinkConnect: Functional Approximation with Group-Sparsity

In this embodiment of the present invention, each output layer of the trained neural network is represented by a smaller subset of functions (i.e., nodes of the layer) that approximately spans the same functional space of the entire output for that layer. That is the number of nodes in each layer of the trained neural network is reduced by representing the nodes of each layer using a linear combination of a smaller subset nodes of that layer. Since the number of nodes for each layer, and hence the number of connections between each layer, is reduced we refer to this method as "Shrink-Connect".

Figure 10:
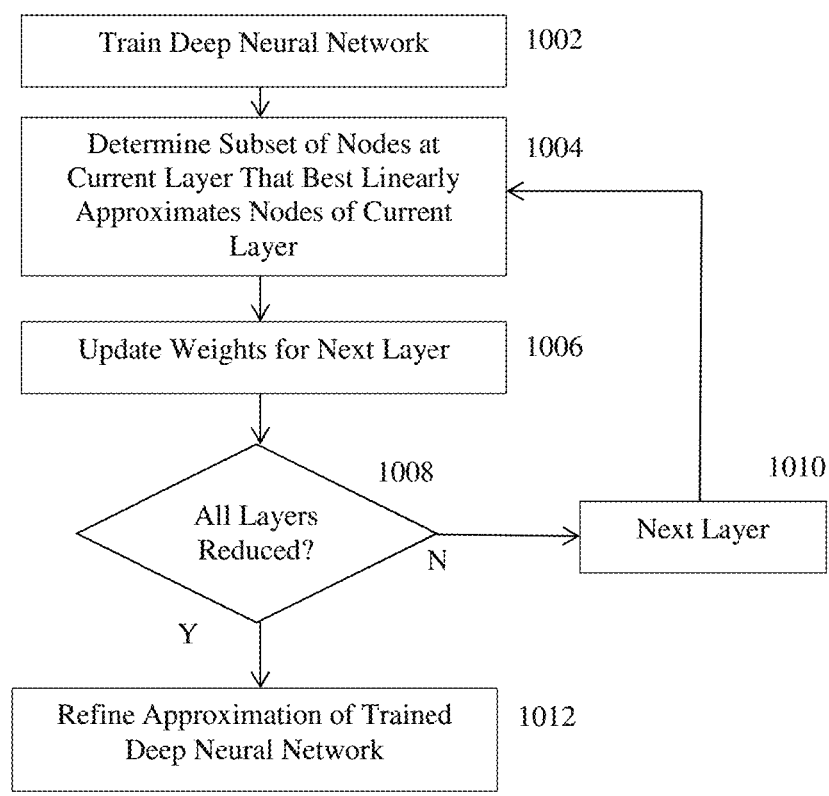
FIG. 10 illustrates a method for approximating a trained deep neural network using functional approximation to reduce the number of nodes in each layer according to an embodiment of the present invention.

FIG. 10 illustrates a method for approximating a trained deep neural network using functional approximation to reduce the number of nodes in each layer according to an embodiment of the present invention. At step 1002, the deep neural network is trained. For example, the deep neural network can be trained using a stacked DAE in an unsupervised learning stage followed by a supervised learning stage as described above in connection with step 102 of FIG. 1.

At step 1004, a subset of nodes in a current layer of the trained deep neural network that best linearly approximates all of the nodes in the current layer is calculated. Let S denote the index of such as subset of functions. Each function in a layer of the deep neural network corresponds to a node in the deep neural network, and the terms "function" and "node" are used interchangeably herein. For the sake of simplicity, we will discard the subscript that indicates the dependence of S in the network's layer. If such as set exists, then the output of a specific layer of the trained deep neural network can be expressed as:

$$a^{(l)}(x) = M^{(l)} a_S^l(x), \forall x. \quad (10)$$

The left hand side $a^{(l)}(x)$ is the output at a specific layer l. On the right hand side, an equivalent output is obtained by linearly combining a small set of functions (nodes) $a_S^{(l)}(x)$, indicated by index set S, with a mixing matrix M. In practice, it is sufficient to satisfy this condition for a finite set of training data samples x: If this condition is met for the finite set of training samples, then the subset of functions $A_S^l$ can be used to reproduce the outputs for all functions $A^l$ in the original trained layer for any input, such that:

$$A^l = M^l A_S^l. \quad (11)$$

The above condition may not be perfectly satisfied due to various noises and artifacts that are often present in the image data. However, a subset of functions (nodes) that approximately satisfies the condition can be identified. In an advantageous implementation, the subset can be identified by solving the following optimization problem:

$$\operatorname*{argmin}_{M} \|A - MA\|_F^2 \quad (12)$$
$$\text{subject to } \|M\|_{col-0} \leq |S|,$$

where the column-sparse constraint, expressed as the quasi-norm $\|M\|_{col-0}$, enforces the selection of a small subset of functions that linearly approximate all output functions. The union of indices of non-zero columns in the matrix M identified by solving the optimization problem is equal to the set S the we are trying to identify. Greedy algorithms, such as simultaneous orthogonal matching pursuit, can be used to optimize the above cost function, and thus identify the subset of nodes that can be used to represent the entire set of nodes for a particular layer and also calculate the mixing matrix M used with the subset of nodes to approximate all of the output functions for that layer.

At step 1006, the weights for the next layer in the trained deep neural network of the tree are adjusted. Since the output functions (nodes) in the current layer are connected to the next layer, the weights connecting nodes in the current layer to the next layer are updated in response to removing nodes from the current layer. In particular, filters (weight matrices) whose indices are not in the subset S are removed and then the weights in the remaining filters are updated as follows:

$$W^{l+1} \leftarrow W^{l+1} M^l_{columns \in S^l}$$
$$W^l \leftarrow W^l_{rows \in S^l} \quad (13)$$

The matrix M expresses the linear dependence of each output function (node) to the selected subset of functions (nodes). The matrix $M^l_{columns \in S^l}$ is the matrix formed by columns of $M^l$ whose indices are in $S^l$. The matrix $W^l_{rows \in S^l}$ is the matrix formed by rows of $W^l$ whose indices are in $S^l$.

At step 1008, it is determined if the nodes for all of the layers is the trained deep neural network have been reduced. If it is determined that not all of the layers have been reduced, the method proceeds to step 1010. If is it determined that all of the layer have been reduced, the method proceeds to step 1012. At step 1010, the method moves to the next layer and returns to step 1004. Steps 1004 and 1006 are then repeated for the next layer. Accordingly, the method propagates through each layer of the trained deep neural network tree to determine a subset of nodes in each layer that approximates the output functions for all of the nodes at that layer and to adjust the weights connecting the layers to compensate for the nodes removed from each layer. At step 1012, once each layer of the trained deep neural network has been reduced, resulting in an approximation of the trained deep neural, the approximation of the deep neural network is refined. In particular, a supervised deep neural network training algorithm, such as supervised back-propagation, can be used to re-train the approximation of the trained deep neural network having the subset of nodes for each network layer, which results in further refinement of the weights for each layer. In an advantageous implementation, multiple iterations of refinement using supervised back-propagation can be used to refine the approximation of the trained deep neural network.

The present inventors tested the method of FIG. 10 on the trained deep neural network for LV apex detection. The goal of the method of FIG. 10 is to simply the trained deep neural network without losing much in classification accuracy. The present inventors applied the method of FIG. 10 to approximate the trained deep neural network for LV detection with a simplification factor of 3 and 5, resulting in simplified deep neural networks of size 1024-340-100-35-2 and 1024-200-50-20-2, respectively. This should lead to 3 and 5 times speed up, respectively, with respect to the original trained deep neural network. Table 2 shows the a comparison for LV apex classification errors for the original trained deep neural network, the two simplified networks, and two deep neural networks of similar size to the simplified networks but trained from scratch.

TABLE 2

| SdA Network Size | Error (%) |
| --- | --- |
| 1024-1024-300-100-2 (original) | 3.09 |
| 1024-340-100-35-2 (simplified) | 3.27 |
| 1024-200-50-20-2 (simplified) | 4.29 |
| 1024-340-100-35-2 (from scratch) | 3.82 |
| 1024-200-50-20-2 (from scratch) | 7.16 |

As shown in Table 2, the degradation in classification accuracy is considerably small between the simplified networks and the original trained deep neural network. It can also be observed in Table 2 that the smaller sized networks trained from scratch (i.e., unsupervised pre-training followed by supervised refinement) perform worse than the simplified networks.

Figure 11:
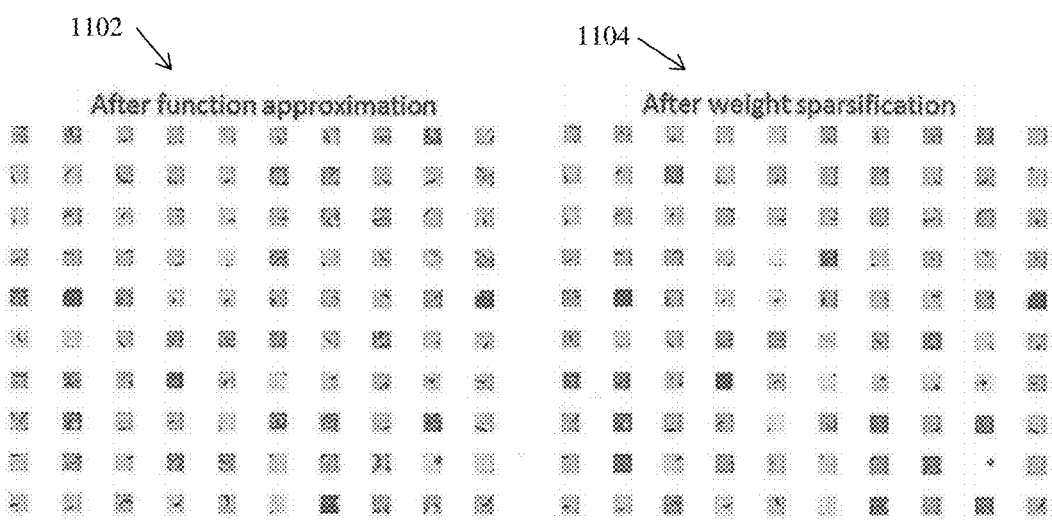
FIG. 11 illustrates a visualization of exemplary filters of the approximation of the trained deep neural network for LV apex detection in 2D MR images after function approximation and weight sparsification.

According to an advantageous embodiment of the present invention, the SparseConnect and ShrinkConnect methods for approximating a trained deep neural network can be combined. The SparseConnect and ShrinkConnect methods exploit different types of redundancy within a trained deep neural network. The methods complement each other and may be combined to achieve an even greater speed up. For example, in a possible implementation, a trained deep neural network can be first be approximated using the ShrinkConnect method to reduce the number of nodes in each layer of the trained deep neural network, followed by using the SparseConnect method (using thresholding or re-weighted L1-norm minimization) to sparsify the weights in the filters connecting each layer in the approximation of the deep neural network resulting from applying the ShrinkConnect method. The present inventors tested this combined method using the thresholding approach for weight sparsification (SparseConnect) in order to approximate the trained deep neural network for LV apex detection in 2D MR images. The original trained deep neural network was simplified by a factor of 3 using the ShrinkConnect method (function approximation) and then further simplified by a factor of 10 using the SparseConnect method (weight sparsification). As a result, a speed up of more 30 times the detection speed of the original trained deep neural network was achieved for LZ apex detection at the error rate of 4.54%. FIG. 11 illustrates a visualization of exemplary filters of the approximation of the trained deep neural network for LV apex detection in 2D MR images after function approximation and weight sparsification. As shown in FIG. 11, image 1102 is a visualization of filters of the approximation of the trained deep neural network after function approximation (ShrinkConnect), and image 1104 is a visualization of the filters of the approximation of the trained deep neural network after weight sparsification (SparseConnect) is performed in addition the function approximation. As can be observed in FIG. 11, there are no random-looking filters after ShrinkConnect is performed. The combination of these methods may produce more meaningful features as compared to using each method alone.

The above described embodiments for approximating trained deep neural networks can be extended such that instead of simplifying an already trained deep neural network, these embodiments can be used to enforce structure on the filters in the deep neural network from the beginning of the training process. For example, the re-weighted L1-norm regularization can be applied from the beginning of training to obtain sparse filters. Another possibility is to maximize correlation among filters at the same time as minimizing the classification errors. This may help to reduce the redundancy of the output (nodes) at each network layer. Alternative approaches can also be used to remove redundant filters and weight coefficients. For example, the sensitivity of the classification accuracy can be greedily checked with respect to removal of each filter or weight coefficient. Those that do not have a large effect on the overall accuracy of the trained deep neural network can be safely removed. The deep neural network can be retrained after each removal in order to compensate for the perturbation resulting from the missing nodes or weights.

Although the method for approximating trained deep neural networks are applied herein to approximate a trained deep neural network for anatomical landmark detection in order to reduce computation time for detecting anatomical landmarks in unseen images using the trained deep neural network, the methods described herein can be similarly utilized to approximate any trained deep neural network in order to perform any classification task.

Figure 12:
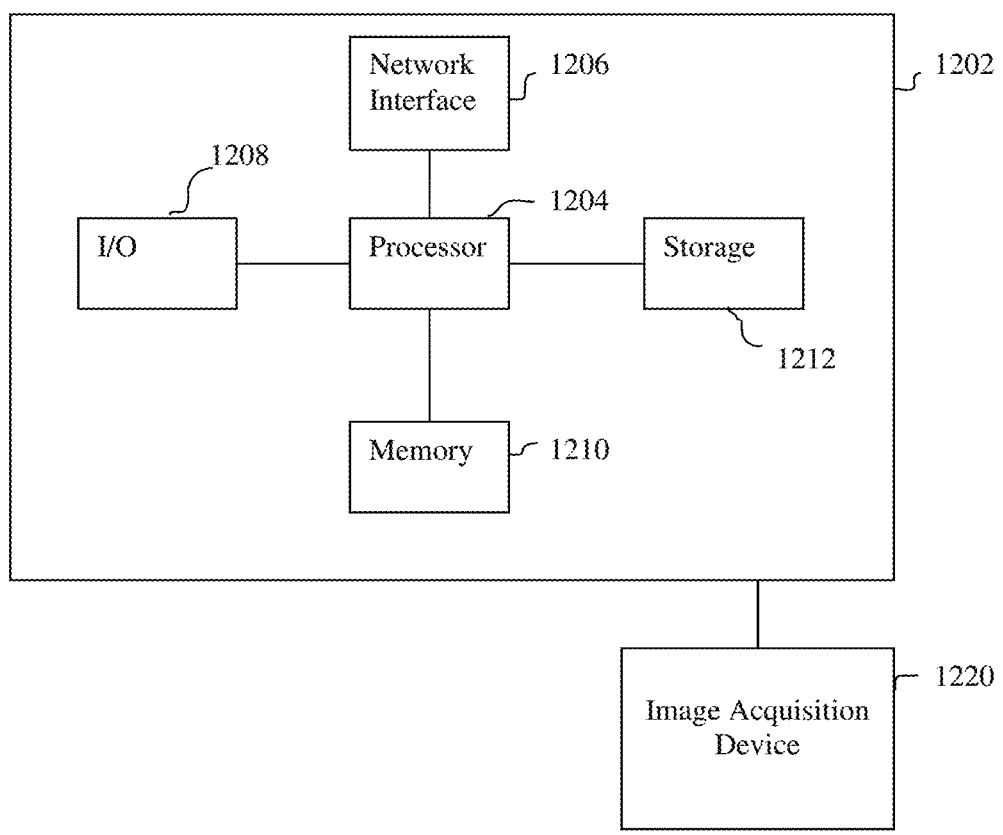
FIG. 12 is a high-level block diagram of a computer capable of implementing the present invention.

The above-described methods for anatomical landmark detection and approximating a trained deep neural network may be implemented on a computer using well-known computer processors, memory units, storage devices, computer software, and other components. A high-level block diagram of such a computer is illustrated in FIG. 12. Computer 1202 contains a processor 1204, which controls the overall operation of the computer 1202 by executing computer program instructions which define such operation. The computer program instructions may be stored in a storage device 1212 (e.g., magnetic disk) and loaded into memory 1210 when execution of the computer program instructions is desired. Thus, the steps of the methods of FIGS. 1, 3, 6, 7, and 10 may be defined by the computer program instructions stored in the memory 1210 and/or storage 1212 and controlled by the processor 1204 executing the computer program instructions. An image acquisition device 1220, such as a CT scanning device, MR scanning device, Ultrasound device, etc., can be connected to the computer 1202 to input image data to the computer 1202. It is possible to implement the image acquisition device 1220 and the computer 1202 as one device. It is also possible that the image acquisition device 1220 and the computer 1202 communicate wirelessly through a network. In a possible embodiment, the computer 1202 may be located remotely with respect to the image acquisition device 1220 and the method steps can be performed as part of a server or cloud based service. The computer 1202 also includes one or more network interfaces 1206 for communicating with other devices via a network. The computer 1202 also includes other input/output devices 1208 that enable user interaction with the computer 1202 (e.g., display, keyboard, mouse, speakers, buttons, etc.). Such input/output devices 1208 may be used in conjunction with a set of computer programs as an annotation tool to annotate volumes received from the image acquisition device 1220. One skilled in the art will recognize that an implementation of an actual computer could contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for anatomical object detection in a medical image comprising:

training a deep neural network to detect the anatomical object in medical images;

calculating an approximation of the trained deep neural network that reduces the computational complexity of the trained deep neural network; and detecting the anatomical object in a received medical image of a patient using the approximation of the trained deep neural network, wherein calculating an approximation of the trained deep neural network that reduces the computational complexity of the trained deep neural network comprises:

for each of a plurality of nodes in each of a plurality of layers of the trained deep neural network, reconstructing a trained weight matrix for the node using 1-D Haar wavelet bases and wavelet coefficients.

2. The method of claim 1, wherein training a deep neural network to detect the anatomical object in medical images comprises training a respective filter for each of the plurality of nodes in each of the plurality of layers of the deep neural network, wherein each respective filter is a weight matrix comprising a plurality of weights that weight node outputs of the nodes of a previous one of the plurality of layers, and calculating an approximation of the trained deep neural network that reduces the computational complexity of the trained deep neural network further comprises:

sparsifying the weights of the filters for each of the plurality of layers of the trained deep neural network.

3. The method of claim 2, wherein sparsifying the weights of the filters for each of the plurality of layers of the trained deep neural network comprises:

reducing a number of non-zero weights in each filter for each of the plurality of layers in the trained deep neural network by setting a predetermined percentage of non-zero weights with lowest magnitudes in each filter equal to zero; and refining the remaining non-zero weights in each filter for each of the plurality of layers to alleviate an effect of reducing the number of non-zero weights in each filter.

4. The method of claim 3, wherein refining the remaining non-zero weights in each filter for each of the plurality of layers to alleviate an effect of reducing the number of non-zero weights in each filter comprises:

performing one or more iterations of back-propagation on the approximation of the trained deep neural network resulting from reducing the number of non-zero weights in each filter to refine the remaining non-zero weights in each filter to reduce a cost function that measures an error between predicted anatomical object locations using the approximation of the trained deep neural network and ground truth anatomical object locations in a set of training data.

5. The method of claim 2, wherein sparsifying the weights of the filters for each of the plurality of layers of the trained deep neural network comprises:

performing re-weighted L1-norm regularization on the weights of the filters for each of the plurality layers of the trained deep neural network, wherein the re-weighted L1-norm regularization drives a plurality of non-zero weights of the filters to zero; and refining the remaining non-zero weights in the filters for each of the plurality of layers to alleviate an effect of driving the plurality of non-zero weights to zero.

6. The method of claim 5, wherein performing re-weighted L1-norm regularization on the weights of the filters for each of the plurality layers of the trained deep neural network, wherein the re-weighted L1-norm regularization drives a plurality of non-zero weights of the filters to zero comprises:

adding a term that re-weights the L1-norm to a cost function that measures an error between predicted anatomical object locations and ground truth anatomical object locations in a set of training data; and performing back-propagation on the trained deep neural network to refine the weights in the filters for each of the plurality of layers of the trained deep neural network to reduce the cost function with the added term that re-weights the L1-norm.

7. The method of claim 6, wherein refining the remaining non-zero weights in the filters for each of the plurality of layers to alleviate an effect of driving the plurality of non-zero weights to zero comprises:

performing one or more iterations of back-propagation on the approximation of the trained deep neural network resulting from driving the plurality of non-zero weights to zero to refine the remaining non-zero weights in the filters to reduce the cost function that measures an error between predicted anatomical object locations and ground truth anatomical object locations in the set of training data, without the added term that re-weights the L1-norm.

8. The method of claim 1, wherein calculating an approximation of the trained deep neural network that reduces the computational complexity of the trained deep neural network further comprises:

determining a subset of nodes of the plurality nodes in a current layer of the trained deep neural network that linearly approximate the plurality of nodes in the current layer of the trained deep neural network and removing the plurality of nodes in the current layer that are not in subset of nodes from the trained deep neural network; and updating weights for a next layer of the trained deep neural network based on the subset of nodes remaining in the current layer of the trained deep neural network.

9. The method of claim 8, wherein determining a subset of nodes of a plurality nodes in a current layer of the trained deep neural network that linearly approximate the plurality of nodes in the current layer of the trained deep neural network and removing the plurality of nodes in the current layer that are not in subset of nodes from the trained deep neural network comprises:

determining the subset of nodes in the current layer and a mixing matrix that best minimizes an error between each of the plurality of nodes in the current layer and a respective approximation for each of the plurality of nodes in the currently layer calculated by linearly combining the subset of nodes using the mixing matrix, subject to a constraint on a size of the subset of nodes.

10. The method of claim 9, wherein updating weights for a next layer of the trained deep neural network based on the subset of nodes remaining in the current layer of the trained deep neural network comprises:

removing filters for the next layer of the trained deep neural network whose indices are not in the subset of nodes in the current layer; and updating the remaining filters for the next layer of the trained deep neural network with weights generated by linearly combining weights of the subset of nodes in the current layer using the mixing matrix to approximate weighted inputs to the next layer from the removed ones of the plurality of nodes in the current layer.

11. The method of claim 8, wherein calculating an approximation of the trained deep neural network that reduces the computational complexity of the trained deep neural network further comprises:

repeating the steps of determining a subset of nodes of a plurality nodes in a current layer of the trained deep neural network that linearly approximate the plurality of nodes in the current layer of the trained deep neural network and removing the plurality of nodes in the current layer that are not in subset of nodes from the trained deep neural network and updating weights for a next layer of the trained deep neural network based on the subset of nodes remaining in the current layer of the trained deep neural network, for each of a plurality of layers in the trained deep neural network, resulting in an initial approximation of the trained deep neural network; and refining the initial approximation of the trained deep neural network by performing one or more iterations of back-propagation on the initial approximation of the trained deep neural network to reduce a cost function that measures an error between predicted anatomical object locations and ground truth anatomical object locations in a set of training data.

12. The method of claim 1, wherein calculating an approximation of the trained deep neural network that reduces the computational complexity of the trained deep neural network further comprises:

for each of the plurality of nodes in each of the plurality of layers of the trained deep neural network, reducing a number of wavelet coefficients used to reconstruct the trained weight matrix for the node.

13. The method of claim 12, wherein detecting the anatomical object in a received medical image of a patient using the approximation of the trained deep neural network comprises:

storing an integral image of the received medical image in a look-up table;

calculating, for each of a plurality of image patches in the received medical image, a respective multiplication result of multiplying the image patch by the 1-D Haar wavelet bases and the transposed Haar 1-D wavelets using look-up operations from the integral image stored in the look-up table; and for each node of a first hidden layer in the approximation of the trained deep neural network, calculating a Frobenius inner product of the wavelet coefficients for that node and the respective multiplication result calculated for each of the plurality of image patches.

14. The method of claim 12, wherein calculating an approximation of the trained deep neural network that reduces the computational complexity of the trained deep neural network further comprises:

for each of the plurality of layers of the trained deep neural network, applying principal component analysis (PCA) to the space of the wavelet coefficients over all of the plurality of nodes for the layer.

15. A method for anatomical object detection in a medical image comprising:

training a deep neural network to detect the anatomical object in medical images;

calculating an approximation of the trained deep neural network that reduces the computational complexity of the trained deep neural network; and detecting the anatomical object in a received medical image of a patient using the approximation of the trained deep neural network, wherein calculating an approximation of the trained deep neural network that reduces the computational complexity of the trained deep neural network comprises:

reconstructing a respective trained weight matrix for each of a plurality of nodes in a current layer of the trained deep neural network using 1-D Haar wavelet bases and respective wavelet coefficients and reducing a number of wavelet coefficients used to reconstruct each respective trained weight matrix; and re-training the approximation of the trained deep neural network resulting from reconstructing the respective trained weight matric for each of the plurality of nodes in the current layer of the trained deep neural network and reducing the number of the wavelet coefficients used to reconstruct each respective trained weight matrix.

16. A method for anatomical object detection in a medical image comprising:

training a deep neural network to detect the anatomical object in medical images;

calculating an approximation of the trained deep neural network that reduces the computational complexity of the trained deep neural network; and detecting the anatomical object in a received medical image of a patient using the approximation of the trained deep neural network, wherein calculating an approximation of the trained deep neural network that reduces the computational complexity of the trained deep neural network comprises:

for each of a plurality of layers in the trained deep neural network, applying principal component analysis (PCA) to a space of trained weight matrices over all of a plurality of nodes in that layer.

17. An apparatus for anatomical object detection in a medical image comprising:

means for training a deep neural network to detect the anatomical object in medical images;

means for calculating an approximation of the trained deep neural network that reduces the computational complexity of the trained deep neural network; and means for detecting the anatomical object in a received medical image of a patient using the approximation of the trained deep neural network, wherein the means for calculating an approximation of the trained deep neural network that reduces the computational complexity of the trained deep neural network comprises:

means for reconstructing a respective trained weight matrix for each of a plurality of nodes in each of a plurality of layers of the trained deep neural network using 1-D Haar wavelet bases and wavelet coefficients.

18. The apparatus of claim 17, wherein the means for training a deep neural network to detect the anatomical object in medical images comprises means for training a respective filter for each of the plurality of nodes in each of the plurality of layers of the deep neural network, wherein each respective filter is a weight matrix comprising a plurality of weights that weight node outputs of the nodes of a previous one of the plurality of layers, and the means for calculating an approximation of the trained deep neural network that reduces the computational complexity of the trained deep neural network further comprises:

means for sparsifying the weights of the filters for each of the plurality of layers of the trained deep neural network.

19. The apparatus of claim 18, wherein the means for sparsifying the weights of the filters for each of the plurality of layers of the trained deep neural network comprises:

means for reducing a number of non-zero weights in each filter for each of the plurality of layers in the trained deep neural network by setting a predetermined percentage of non-zero weights with lowest magnitudes in each filter equal to zero; and means for refining the remaining non-zero weights in each filter for each of the plurality of layers to alleviate an effect of reducing the number of non-zero weights in each filter.

20. The apparatus of claim 18, wherein the means for sparsifying the weights of the filters for each of the plurality of layers of the trained deep neural network comprises:

means for performing re-weighted L1-norm regularization on the weights of the filters for each of the plurality layers of the trained deep neural network, wherein the re-weighted L1-norm regularization drives a plurality of non-zero weights of the filters to zero; and means for refining the remaining non-zero weights in the filters for each of the plurality of layers to alleviate an effect of driving the plurality of non-zero weights to zero.

21. The apparatus of claim 17, wherein the means for calculating an approximation of the trained deep neural network that reduces the computational complexity of the trained deep neural network further comprises:

means for determining a subset of nodes of the plurality nodes in each layer of the trained deep neural network that linearly approximate the plurality of nodes in that layer of the trained deep neural network and removing the plurality of nodes in each layer that are not in subset of nodes from the trained deep neural network; and means for updating weights for each layer of the trained deep neural network based on the subset of nodes remaining in a preceding layer of the trained deep neural network.

22. The apparatus of claim 21, wherein the means for calculating an approximation of the trained deep neural network that reduces the computational complexity of the trained deep neural network further comprises:

means for refining the approximation of the trained deep neural network by performing one or more iterations of back-propagation on the approximation of the trained deep neural network to reduce a cost function that measures an error between predicted anatomical object locations and ground truth anatomical object locations in a set of training data.

23. The apparatus of claim 17, wherein the means for calculating an approximation of the trained deep neural network that reduces the computational complexity of the trained deep neural network further comprises:

means for reducing a number of wavelet coefficients used to reconstruct the respective trained weight matrix for each of the plurality of nodes in each of the plurality of layers of the trained deep neural network.

24. A non-transitory computer readable medium storing computer program instructions for anatomical object detection in a medical image, the computer program instructions when executed by a processor cause the processor to perform operations comprising:

training a deep neural network to detect the anatomical object in medical images;

calculating an approximation of the trained deep neural network that reduces the computational complexity of the trained deep neural network; and detecting the anatomical object in a received medical image of a patient using the approximation of the trained deep neural network, wherein calculating an approximation of the trained deep neural network that reduces the computational complexity of the trained deep neural network comprises:

for each of a plurality of nodes in each of a plurality of layers of the trained deep neural network, reconstructing a trained weight matrix for the node using 1-D Haar wavelet bases and wavelet coefficients.

25. The non-transitory computer readable medium of claim 24, wherein training a deep neural network to detect the anatomical object in medical images comprises training a respective filter for each of the plurality of nodes in each of the plurality of layers of the deep neural network, wherein each respective filter is a weight matrix comprising a plurality of weights that weight node outputs of the nodes of a previous one of the plurality of layers, and calculating an approximation of the trained deep neural network that reduces the computational complexity of the trained deep neural network further comprises:

sparsifying the weights of the filters for each of the plurality of layers of the trained deep neural network.

26. The non-transitory computer readable medium of claim 25, wherein sparsifying the weights of the filters for each of the plurality of layers of the trained deep neural network comprises:

reducing a number of non-zero weights in each filter for each of the plurality of layers in the trained deep neural network by setting a predetermined percentage of non-zero weights with lowest magnitudes in each filter equal to zero; and refining the remaining non-zero weights in each filter for each of the plurality of layers to alleviate an effect of reducing the number of non-zero weights in each filter.

27. The non-transitory computer readable medium of claim 25, wherein sparsifying the weights of the filters for each of the plurality of layers of the trained deep neural network comprises:

performing re-weighted L1-norm regularization on the weights of the filters for each of the plurality layers of the trained deep neural network, wherein the re-weighted L1-norm regularization drives a plurality of non-zero weights of the filters to zero; and refining the remaining non-zero weights in the filters for each of the plurality of layers to alleviate an effect of driving the plurality of non-zero weights to zero.

28. The non-transitory computer readable medium of claim 24, wherein calculating an approximation of the trained deep neural network that reduces the computational complexity of the trained deep neural network further comprises:

determining a subset of nodes of the plurality nodes in a current layer of the trained deep neural network that linearly approximate the plurality of nodes in the current layer of the trained deep neural network and removing the plurality of nodes in the current layer that are not in subset of nodes from the trained deep neural network; and updating weights for a next layer of the trained deep neural network based on the subset of nodes remaining in the current layer of the trained deep neural network.

29. The non-transitory computer readable medium of claim 28, wherein calculating an approximation of the trained deep neural network that reduces the computational complexity of the trained deep neural network further comprises:
repeating the steps of determining a subset of nodes of a plurality nodes in a current layer of the trained deep neural network that linearly approximate the plurality of nodes in the current layer of the trained deep neural network and removing the plurality of nodes in the current layer that are not in subset of nodes from the trained deep neural network and updating weights for a next layer of the trained deep neural network based on the subset of nodes remaining in the current layer of the trained deep neural network, for each of a plurality of layers in the trained deep neural network, resulting in an initial approximation of the trained deep neural network; and
refining the initial approximation of the trained deep neural network by performing one or more iterations of back-propagation on the initial approximation of the trained deep neural network to reduce a cost function that measures an error between predicted anatomical object locations and ground truth anatomical object locations in a set of training data.

30. The non-transitory computer readable medium of claim 24, wherein calculating an approximation of the trained deep neural network that reduces the computational complexity of the trained deep neural network further comprises:
for each of the plurality of nodes in each of the plurality of layers of the trained deep neural network, reducing a number of wavelet coefficients used to reconstruct the trained weight matrix for the node.

31. The non-transitory computer readable medium of claim 30, wherein calculating an approximation of the trained deep neural network that reduces the computational complexity of the trained deep neural network further comprises:
for each of the plurality of layers of the trained deep neural network, applying principal component analysis (PCA) to the space of the wavelet coefficients over all of the plurality of nodes for the layer.

32. The non-transitory computer readable medium of claim 30, wherein detecting the anatomical object in a received medical image of a patient using the approximation of the trained deep neural network comprises:
storing an integral image of the received medical image in a look-up table;
calculating, for each of a plurality of image patches in the received medical image, a respective multiplication result of multiplying the image patch by the 1-D Haar wavelet bases and the transposed Haar 1-D wavelets using look-up operations from the integral image stored in the look-up table; and
for each node of a first hidden layer in the approximation of the trained deep neural network, calculating a Frobenius inner product of the wavelet coefficients for that node and the respective multiplication result calculated for each of the plurality of image patches.

33. A non-transitory computer readable medium storing computer program instructions for anatomical object detection in a medical image, the computer program instructions when executed by a processor cause the processor to perform operations comprising:
training a deep neural network to detect the anatomical object in medical images;
calculating an approximation of the trained deep neural network that reduces the computational complexity of the trained deep neural network; and
detecting the anatomical object in a received medical image of a patient using the approximation of the trained deep neural network, wherein calculating an approximation of the trained deep neural network that reduces the computational complexity of the trained deep neural network comprises:
for each of a plurality of layers in the trained deep neural network, applying principal component analysis (PCA) to a space of trained weight matrices over all of a plurality of nodes in that layer.

* * * * *